US009007619B2

(12) United States Patent
Yamazaki

(10) Patent No.: US 9,007,619 B2
(45) Date of Patent: Apr. 14, 2015

(54) PRINTING APPARATUS, NON-TRANSITORY COMPUTER READABLE MEDIUM USED FOR PRINTING APPARATUS, AND METHOD OF CONTROLLING PRINTING APPARATUS

(71) Applicant: Masataka Yamazaki, Kuwana (JP)

(72) Inventor: Masataka Yamazaki, Kuwana (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 0 days.

(21) Appl. No.: 14/220,195

(22) Filed: Mar. 20, 2014

(65) Prior Publication Data

US 2014/0285834 A1     Sep. 25, 2014

(30) Foreign Application Priority Data

Mar. 22, 2013   (JP) ................. 2013-059849

(51) Int. Cl.
*G06F 3/12*     (2006.01)
*G06F 15/02*    (2006.01)
*G06K 15/02*    (2006.01)

(52) U.S. Cl.
CPC ............ *G06F 3/1274* (2013.01); *G06F 3/1222* (2013.01); *G06F 3/1238* (2013.01); *G06F 3/1258* (2013.01); *G06K 15/02* (2013.01)

(58) Field of Classification Search
CPC ... G06F 3/1222; G06F 3/1238; G06F 3/1258; G06F 3/1274; G06K 15/02
USPC .................... 358/1.1–1.9, 1.11–1.18
See application file for complete search history.

(56) References Cited

U.S. PATENT DOCUMENTS

| 8,107,104 B2 | 1/2012 | Mihara |
| 2006/0050311 A1 | 3/2006 | Aichi et al. |
| 2009/0051955 A1 | 2/2009 | Mihara |
| 2011/0063648 A1* | 3/2011 | Moore .................. 358/1.13 |

FOREIGN PATENT DOCUMENTS

| JP | H05-077525 A | | 3/1993 |
| JP | 2003-226047  | * | 1/2003 |
| JP | 2003-226047 A | | 8/2003 |
| JP | 2006-076090 A | | 3/2006 |
| JP | 2009-045893 A | | 3/2009 |

* cited by examiner

*Primary Examiner* — King Poon
*Assistant Examiner* — Ibrahim Siddo
(74) *Attorney, Agent, or Firm* — Banner & Witcoff, Ltd.

(57) ABSTRACT

A printing apparatus includes a job receiver, a printing unit, a command receiver, a processor, and a memory. The printing apparatus is caused to determine whether the printing apparatus is in a secure mode when the command receiver receives a cancel command, perform a secure cancellation process when the command receiver receives the cancel command and the printing apparatus is in the secure mode, and perform a non-secure cancellation process when the command receiver receives the cancel command and the printing apparatus is not in the secure mode. The secure cancellation process includes analyzing a print job received by the job receiver and whose analysis is not finished, determining whether an analyzed print job is a secure print job or a normal print job, maintaining printing of the analyzed print job that is the secure print job, and cancelling the printing of the analyzed print job that is the normal print job.

17 Claims, 9 Drawing Sheets

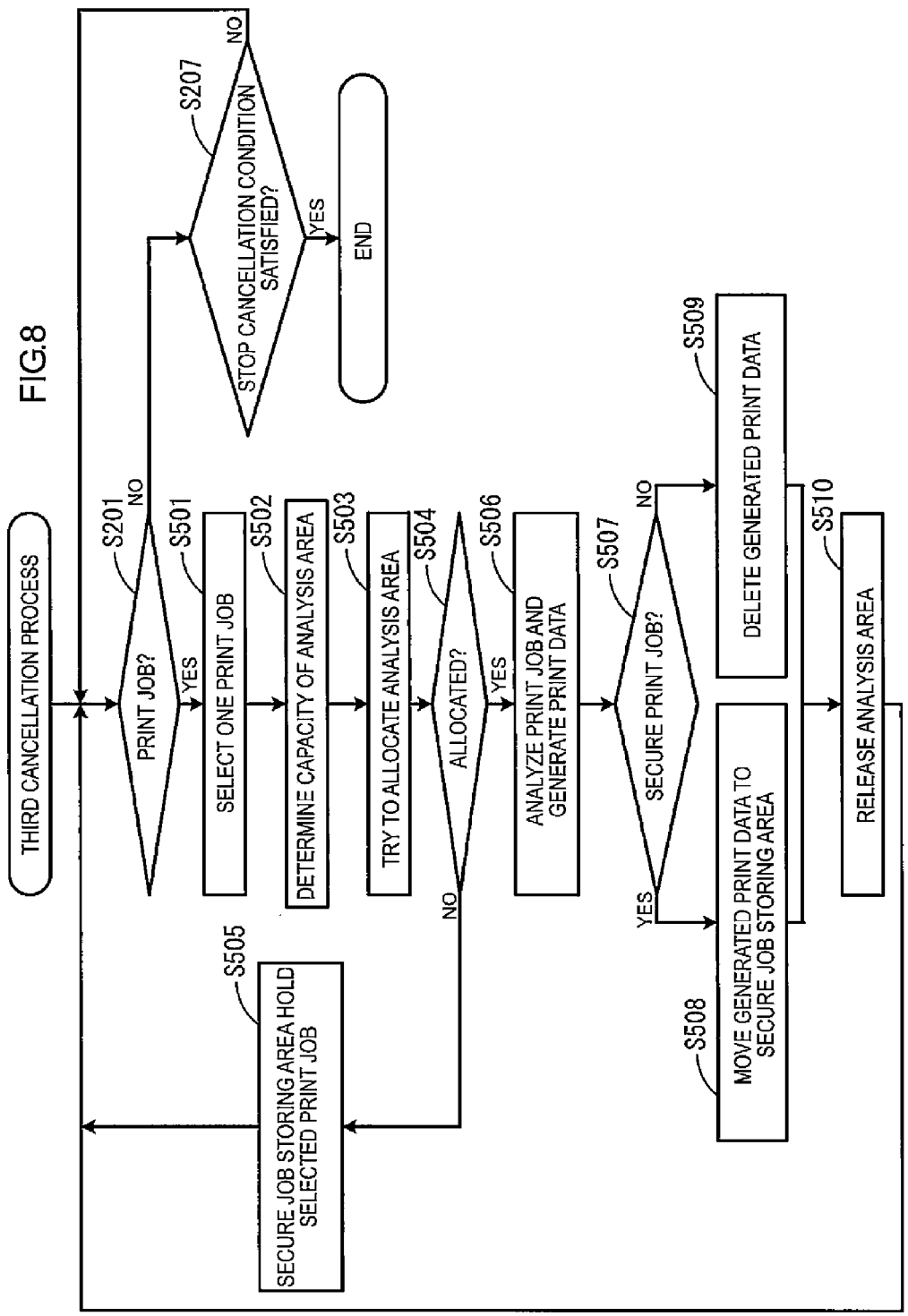

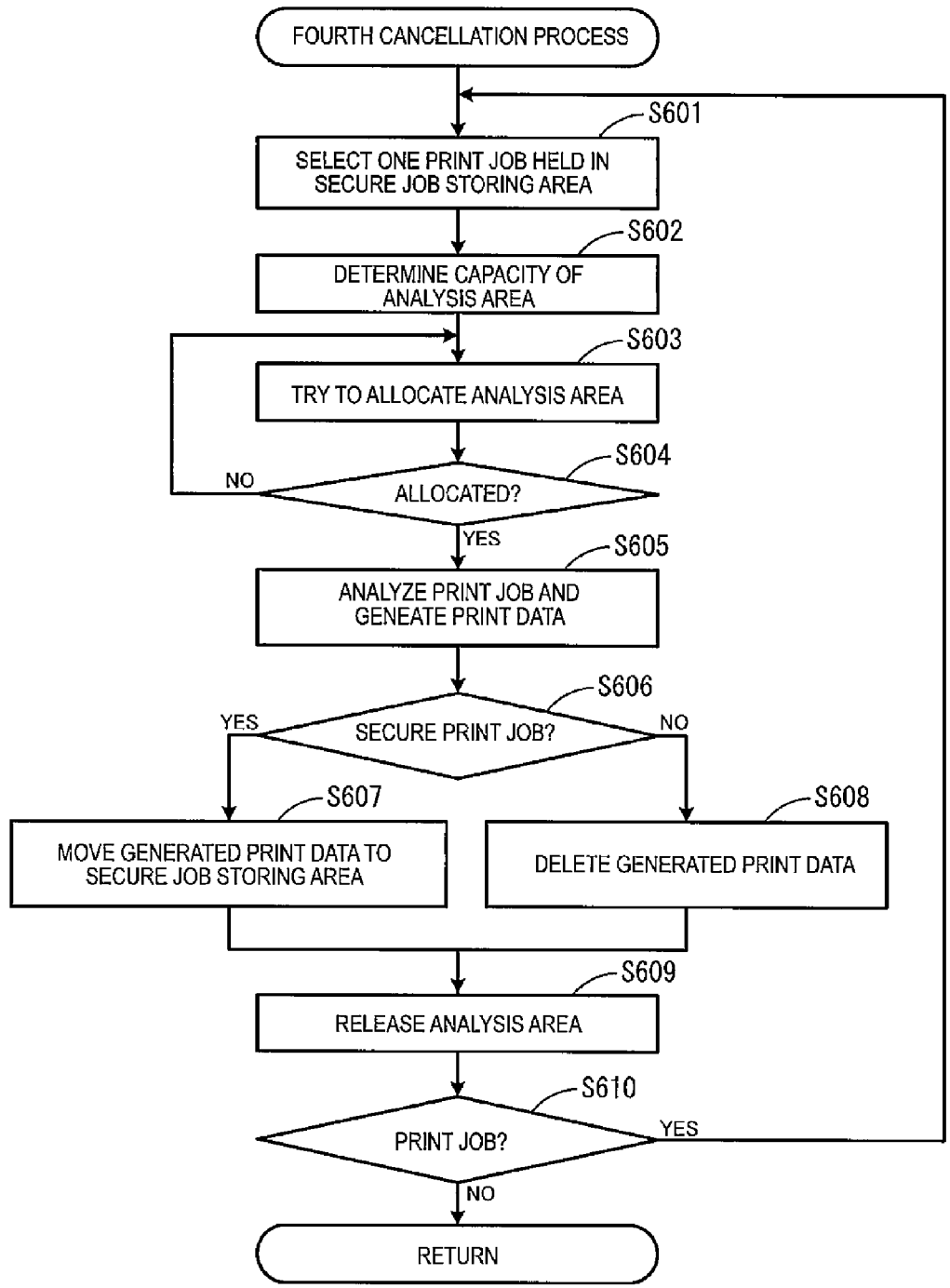

PRINTING APPARATUS, NON-TRANSITORY COMPUTER READABLE MEDIUM USED FOR PRINTING APPARATUS, AND METHOD OF CONTROLLING PRINTING APPARATUS

CROSS REFERENCE TO RELATED APPLICATION

The present application claims priority from Japanese Patent Application No. 2013-059849 filed on Mar. 22, 2013, which is incorporated herein by reference.

TECHNICAL FIELD

The present disclosure relates to a technique for canceling a printing operation.

BACKGROUND

There has been known a printing apparatus having a cancel key on its operation panel for operating a cancel command. One example is that the printing apparatus stops conveying print sheets and erases all pint data stored in the input buffer after receiving the cancel command.

SUMMARY

According to the above example, when the cancel command is received, the input buffer is cleared by erasing all the print data stored therein. Therefore, important data such as confidential data, which is a print job associated with a password, may be also erased.

The specification describes a technology which can accommodate respectively a user request that a secure (confidential) print job is not cancelled by a cancel command, and a user request that the printing operation is stopped as soon as possible by the cancel command even if the print jobs to be canceled include the secure print job.

According to the technology of the description, a printing apparatus includes a job receiver, a printing unit, a command receiver, a processor, and a memory storing instructions. The instructions that, when executed by the processor, cause the printing apparatus to analyze a print job received by the job receiver, cause the printing unit to print an image based on an analyzed print job that is received by the job receiver and whose analysis is finished, determine whether the printing apparatus is in a secure mode in which the printing unit prints the image after successful user certification when the command receiver receives a cancel command for cancelling printing of the print job, perform a secure cancellation process when the command receiver receives the cancel command and the printing apparatus is in the secure mode, and perform a non-secure cancellation process when the command receiver receives the cancel command and the printing apparatus is not in the secure mode. The secure cancellation process includes analyzing a print job that is received by the job receiver and whose analysis is not finished, determining whether an analyzed print job is a secure print job that is associated with a password or a normal print job that is not associated with a password in accordance with an analysis result, maintaining printing of the analyzed print job when the analyzed print job is the secure print job, and cancelling the printing of the analyzed print job when the analyzed print job is the normal print job. The non-secure cancellation process includes cancelling the printing of the print job that is received by the job receiver.

BRIEF DESCRIPTION OF THE DRAWINGS

FIG. 8 is a flowchart of a third cancellation process.

FIG. 9 is a flowchart of a fourth cancellation process.

DETAILED DESCRIPTION

<One Illustrative Aspect>

(1) Electric Configuration of Multifunction Apparatus

Figure 1:
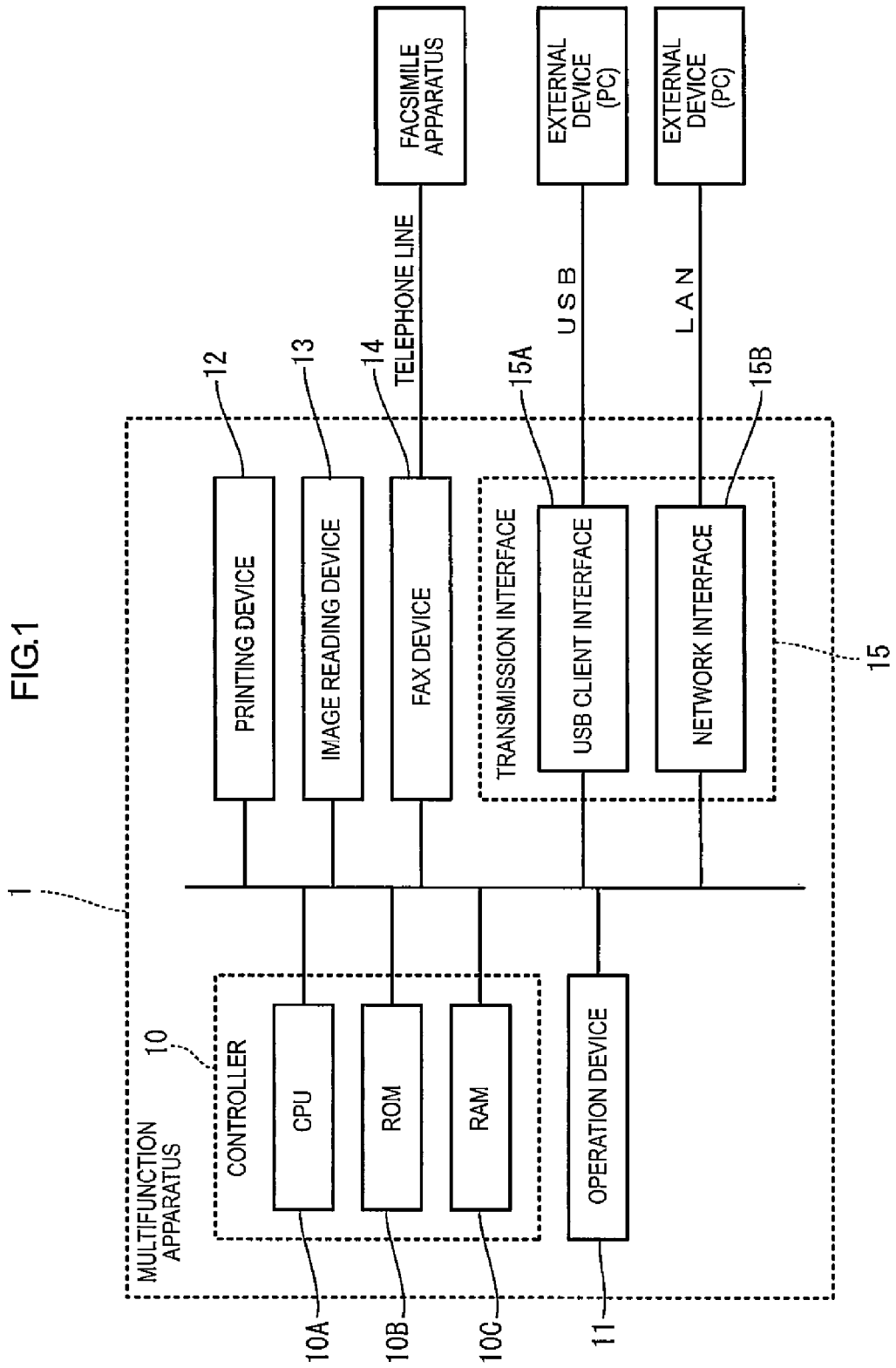
FIG. 1 is a block diagram simply illustrating an electric configuration of a multifunction apparatus according to one illustrative aspect.

As illustrated in FIG. 1, a multifunction apparatus 1 is an example of a printing apparatus. The multifunction apparatus 1 includes a controller 10, an operation device 11, a printing device 12, an image reading device 13, a facsimile (fax) device 14, and a transmission interface 15.

The controller 10 includes a CPU 10A, a ROM 10B, and a RAM 10C. The CPU 10A executes various control programs stored in the ROM 10B to control each part of the multifunction apparatus 1. The ROM 10B stores the control programs executed by the CPU 10A and various data. The RAM 10C is used as a main storing device when the CPU 10A executes various processing. The CPU 10A is an example of a processor and the RAM 10C is an example of a memory.

The operation device 11 includes a liquid crystal display and various operation buttons. A user operates the operation device 11. Accordingly, operations of secure printing are performed, a secure printing mode is set to be ON or OFF, and a cancel command is input to cancel or stop printing. The operation device 11 is an example of a secure mode setting command receiver and a cancel command receiver. When the secure printing mode is ON, the printing device 12 is in the secure mode in which the printing device 12 performs an image forming operation after successful user certification, for example, matching between a password associated with the print job that is to be printed and a password input by the user. When the secure printing mode is OFF, the printing device 12 is in a normal mode in which the printing device 12 performs the image forming operation without the user certification.

The cancel command includes a single job cancel command and a multiple jobs cancel command. Only one print job is cancelled in response to receiving of the single job cancel command, and print jobs are collectively cancelled in response to receiving of the multiple jobs cancel command. The operation buttons arranged in the operation device 11 includes a cancel button via which the cancel command is input. If the cancel button is pressed for a short time, the single job cancel command is input, and if the cancel button is pressed for a long time, the multiple jobs cancel command is input. Detailed operations regarding the cancel command will be described later.

In the printing device 12, an image is printed on a sheet such as a print sheet with an electro photographic method or an ink jetting method. The image reading device 13 includes a light source that irradiates a draft with light and a linear image sensor and reads data of the draft and generates image data. The fax device 14 transmits fax data to and receives fax data from an external facsimile device via a telephone line according to a predetermined facsimile transmission protocol.

The transmission interface 15 includes a universal serial bus (USB) client interface 15A and a network interface 15B as transmission interfaces. The transmission interface 15 is an example of a job receiver.

The USB client interface 15A is a hardware that connects the multifunction apparatus 1 and an external device such as a PC that operates as an USB host so as to communicate with each other via a USB cable. The network interface 15B is a hardware that connects the multifunction apparatus 1 and an external device so as to communicate with each other via a transmission network such as a local area network (LAN) or an internet.

The CPU 10A receives a print job from an external device via the transmission interface 15 and analyzes the received print data and generates print data. The CPU 10A controls the printing device 12 to print an image based on the generated print data. The operation of controlling the printing device 12 to print the image is an example of a print process.

(2) Secure Printing

The multifunction apparatus 1 is configured to execute secure printing. With the secure printing, after a user transmits a print job from the external device to the multifunction apparatus 1, a printing result is not seen by any other person while the user moves to the multifunction apparatus 1 to receive the printing result.

In executing the secure printing, a user transmits a print job from the external device to the multifunction apparatus 1 with setting a password to the print job. In the following description, a print job associated with a password is referred to as a secure print job, and a print job that is not associated with a password is referred to as a normal print job.

In receiving a secure print job, the multifunction apparatus 1 does not start performance for the secure print job right away and does not perform a print operation for the secure print job until a password that matches the password set to the secure print job is input. After a user transmits the secure print job, he/she moves to the multifunction apparatus 1 and operates the operation device 11 of the multifunction apparatus 1 to select a desired secure print job and input a password.

The controller 10 of the multifunction apparatus 1 determines whether the password input via the operation device 11 by the user matches the password set to the selected secure print job. If determining that the passwords match, the controller 10 of the multifunction apparatus 1 determines that authentication is successful and controls the printing device 12 to print the secure print job. If determining that the passwords do not match, the controller 10 determines that authentication is failed and does not perform a print operation for the secure print job.

(3) Storing Area Used for Printing Operation

Figure 2:
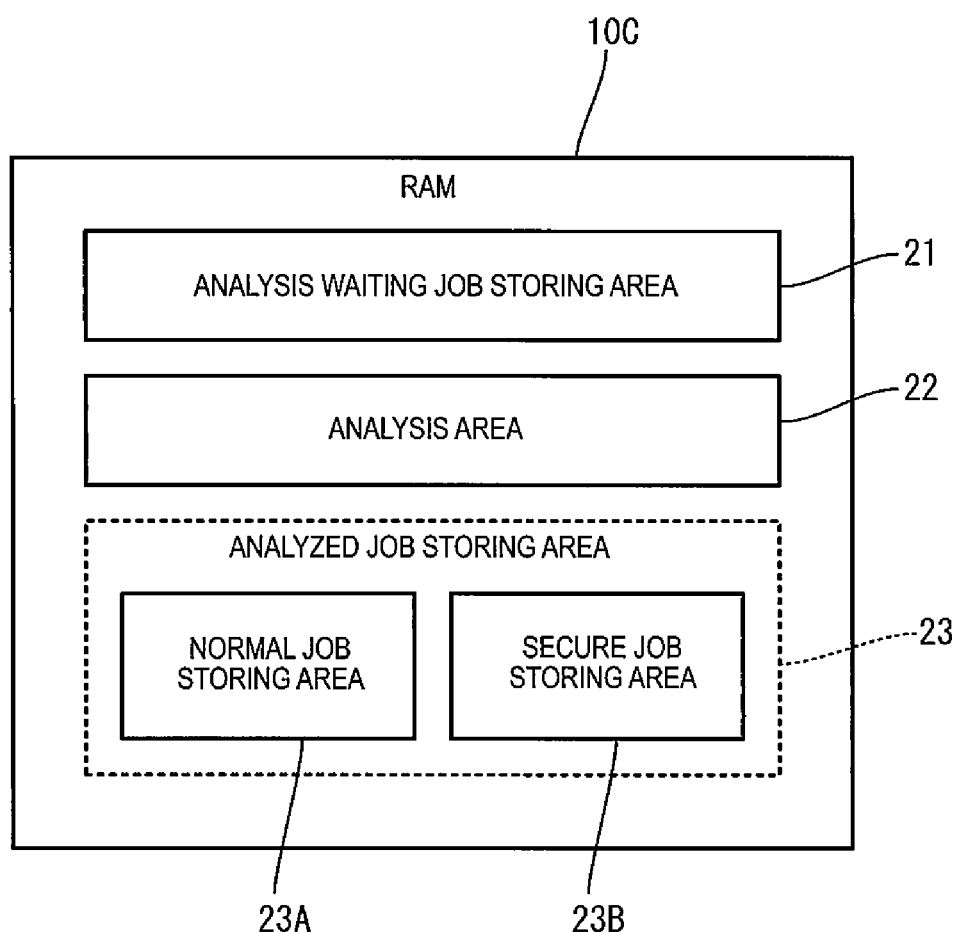
FIG. 2 is a typical view illustrating a storing area used for printing.

FIG. 2 illustrates a storing area used for a printing operation. The storing area is allocated in the RAM 10C. The storing area allocated in the RAM 10C includes at least an analysis waiting job storing area 21, an analysis area 22, and an analyzed job storing area 23.

The analysis waiting job storing area 21 stores a print job that is received via the transmission interface 15. The controller 10 of the multifunction apparatus 1 stores the print job received via the transmission interface 15 in the analysis waiting job storing area 21.

The analysis area 22 is used for analyzing a print job. If determining that a print job is stored in the analysis waiting job storing area 21, the controller 10 analyzes the print job using the analysis area 22 and generates print data.

The print jobs include various kinds of print jobs. Such various kinds of print jobs include, for example, a print job in which a print condition and image data that is represented by a bit map method are separately described, a print job in which a print condition and image data that is represented by a page description language are separately described, and a print job in which a print condition and image data are collectively described by a page description language.

Generally, analysis of a print job and generation of print data are not performed independently. A printing apparatus generally performs each of analysis of a print job and generation of print data as single processing, and therefore only the analysis cannot be selectively performed.

Generally, a capacity of the analysis area 22 that is necessary for analyzing a print job changes according to each print job or a kind of the print job.

The analyzed job storing area 23 stores print data that is generated via the analysis performed using the analysis area 22. The analyzed job storing area 23 includes a normal job storing area 23A and a secure job storing area 23B.

When analyzing the print job stored in the analysis waiting job area 21 and generating print data, the controller 10 of the multifunction apparatus 1 determines whether the print job is a normal print job or a secure print job based on the analyzed result.

When determining that the print job is a normal print job, the controller 10 stores the generated print data in the normal job storing area 23A as a normal print job. On the other hand, when determining that the print job is a secure print job, the controller 10 stores the generated print data in the secure job storing area 23B as a secure print job.

The analysis waiting job storing area 21 and the analyzed job storing area 23 are allocated in the RAM 10C when a power of the multifunction apparatus 1 is turned on, and they are maintained to be allocated in the RAM 10C until the power is turned off.

On the other hand, the analysis area 22 is dynamically allocated in the RAM 10C when generating print data, and after the print data is generated, the analysis area 22 is released to be freely used. The RAM 10C also stores image data that is generated by the image reading device 13 and fax data that is received by the fax device 14. Therefore, if a vacant capacity in the RAM 10C is insufficient, the allocation of the analysis area 22 in the RAM 10C may be failed.

(4) Cancel Command

As described before, the cancel command includes a single job cancel command and a multiple jobs cancel command.

(4-1) Single Job Cancel Command

When the single job cancel command is input, only one active print job is canceled and deleted. The active print job means a print job that is at a highest rank among following states State 1 to State 5. State 1 is a highest rank and State 5 is a lowest rank.

If print jobs are at a highest rank, one of the print jobs that is received first is defined as the active print job.

State 1: printing
State 2: waiting for printing
State 3: analyzing
State 4: waiting for analyzing
State 5: receiving If one of the print job that is in a state of printing (State 1) and the print job that is in a state of waiting for printing (State 2) is an active print job, the following operation will be performed regardless of whether the secure mode is ON or OFF. If the active print job is a normal print job, the active print job is deleted. If the active print job is a secure print job, the active print job is not deleted. However, a user may want to cancel and delete the secure print job. Therefore, the controller 10 of the multifunction apparatus 1 informs the user to input the password that is set to the secure print job. The controller 10 determines whether the input password input via the operation device 11 matches the associated password. If determining that the passwords match, the controller 10 deletes the secure print job. If determining that the passwords do not match, the controller 10 does not delete the secure print job. If the active print job is a secure print job that is in a state of printing and a single job cancel command is received, the printing operation may be stopped.

(4-2) Multiple Jobs Cancel Command

In response to input of the multiple jobs cancel command, print jobs are to be collectively cancelled. For example, print jobs that are to be cancelled in response to input of the multiple jobs cancel command include following print jobs (A1) to (A4) excluding a secure print job in a state of waiting for printing that is stored in the secure job storing area 23B.

If the print jobs that are to be cancelled are secure print jobs in a state of printing and the multiple jobs cancel command is received, the operation similar to a case in which the single job cancel command is input may be performed. In the following description, the secure print job in a state of printing is not set as a print job that is to be cancelled.

(A1) a print job that is stored in the analysis waiting job storing area 21 when receiving the multiple jobs cancel command (A2) a print job that is stored in the analysis area 22 and in a state of being analyzed when receiving the multiple jobs cancel command (A3) a normal print job that is stored in the normal job storing area 23A when receiving the multiple jobs cancel command The normal print job stored in the normal job storing area 23A may be in a state of printing or in a state of print waiting state regardless of whether the secure mode is ON or OFF. In the multifunction apparatus 1, the normal print job that is in a state of printing and the normal print job that is in a state of print waiting are both set as a print job to be canceled. If the print job that is in a state of printing is ordered to be cancelled, printing of pages that are subsequent to the page that is being printed is cancelled when receiving the multiple jobs cancel command.

(A4) a print job that is received during a period from a time when receiving the multiple jobs cancel command to a time when a following stopping cancellation condition is satisfied The stopping cancellation condition may include following conditions (B1) and (B2). The controller 10 of the multifunction apparatus 1 determines that the stopping cancellation condition is satisfied when at least one of the conditions (B1) and (B2) is satisfied. If the stopping cancellation condition is satisfied, the print job is not cancelled.

Figure 3:
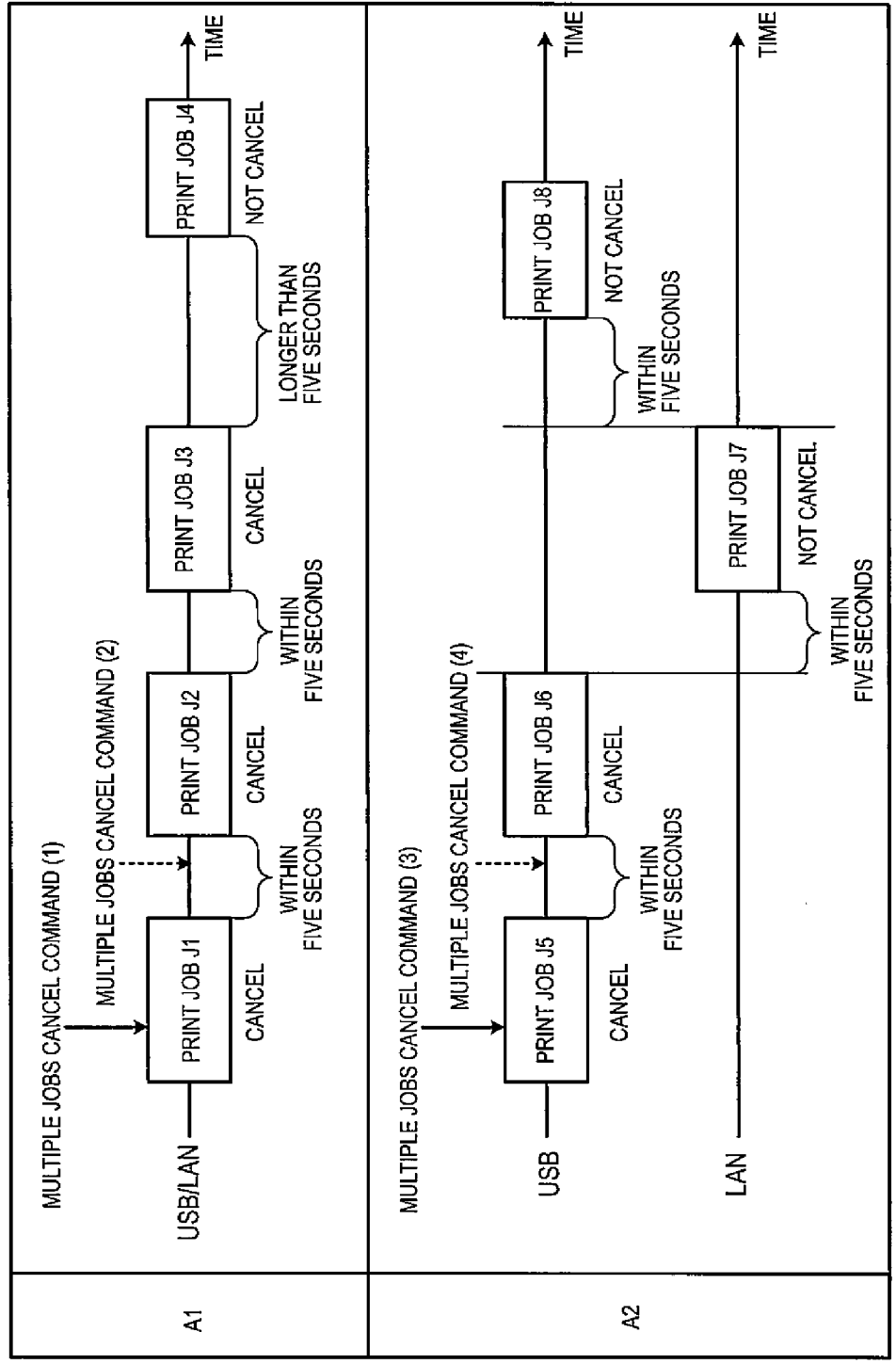
FIG. 3 is a chart for explaining stopping cancellation conditions.

(B1) When a subsequent print job is not received within five seconds from completion of receiving of the previous print job As illustrated in FIG. 3, for example, if a print job J1 is being received when receiving the multiple jobs cancel command (1), the print job J1 that is being received corresponds to the previous print job. If receiving of a subsequent print job J2 is started within five seconds from the completion of receiving of the previous print job J1, the print job J2 also corresponds to an object print job that is to be cancelled. If receiving of a subsequent print job J3 is started within five seconds from the completion of receiving of the print job J2, the print job J3 also corresponds to an object print job that is to be cancelled.

In the example in FIG. 3, a period from the completion of receiving of the print job J3 to the starting of receiving of a subsequent print job J4 is longer than five seconds. In such a case, the print cancellation condition is satisfied when five seconds is elapsed after the completion of receiving of the print job J3, and accordingly, print jobs received after the print job J4 do not correspond to object print jobs that are to be cancelled in response to the current cancel command.

If a print job is not being received when receiving the multiple jobs cancel command (2), it is determined whether the stopping cancellation condition is satisfied for the print job J1 that is just received. In this case, the print job J1 for which receiving is just completed is considered as the previous print job.

(B2) When the transmission interface via which a print job is received is changed As described before, the transmission interface 15 includes the USB client interface 15A and the network interface 15B as the interface. In FIG. 3, the USB client interface 15A is described as USB and the network interface 15B is described as LAN.

For example, as illustrated in FIG. 3, when the multiple jobs cancel command (3) is received, the print job J5 is being received via the USB, and receiving of a subsequent print job J6 is started within five seconds from the completion of receiving of the print job J5. In such a case, the print job J6 also corresponds to an object print job that is to be cancelled.

The receiving of a subsequent print job J7 via LAN is started within five seconds from the completion of receiving of the print job J6. In such a case, the time period from the completion of receiving of the print job J6 to starting of receiving of the print job J7 is less than five seconds. However, the transmission interface via which the print job is received is changed from the USB to the LAN. Therefore, the stopping cancellation condition is satisfied when the transmission interface changes. Accordingly, print jobs received after the print job J7 do not correspond to object print jobs that are to be cancelled in response to the current cancel command.

If a print job is not being received when receiving the multiple jobs cancel command (4), the print job J5 that is just received is considered as the previous print job. In such a case, the print job J5 is received via the USB, and if a print job J7 subsequent to the print job J5 is started to be received via the LAN, it is determined that the transmission interface changes.

The print cancellation process performed when receiving the single job cancel command is substantially same as the print cancellation process performed when receiving the multiple jobs cancel command excluding that the object print job to be cancelled is different. Therefore, the process performed in response to receiving the multiple jobs cancel command will be described.

(5) ON/OFF Setting of Secure Mode

An ON/OFF setting button of the operation device 11 is operated to set the secure mode of the multifunction apparatus 1 to be ON or OFF, for example. Based on a state of the secure mode that is ON or OFF, the controller 10 of the multifunction apparatus 1 performs different processes when receiving the multiple jobs cancel command.

(5-1) If Secure Mode is ON

When the secure mode is ON and the controller 10 of the multifunction apparatus 1 receives input of the multiple jobs cancel command, the controller 10 analyzes all of the print jobs that are in a state of waiting for analysis among the object print jobs to be cancelled. Among the analyzed print jobs, the controller 10 cancels the normal print jobs and does not cancel the secure print jobs.

Specifically, the print job (A3) is already analyzed and confirmed to be the normal print job. Therefore, the controller 10 deletes all the print jobs stored in the normal job storing area 23A.

The print job (A2) is being analyzed, and the controller 10 continues analyzing it. If determining that the analyzed print job is a normal print job, the controller 10 deletes it from the analysis area 22. If determining that the analyzed print job is a secure print job, the controller 10 stores it in the secure job storing area 23B.

It is not sure whether each of the print jobs (A1) and (A4) is a secure print job or a normal print job when receiving the multiple jobs cancel command. Therefore, the controller 10 of the multifunction apparatus 1 analyzes each of the print jobs (A1) and (A4) and generates print data and determines whether each of the print jobs (A1) and (A4) is a secure print job or a normal print job based on the analysis result. The controller 10 deletes the print job if it is determined to be a normal print job, and the controller 10 stores the print job in the secure job storing area 23B if it is determined to be a secure print job. The print job (A4) is stored in the analysis waiting job storing area 21 and thereafter analyzed.

(5-2) If Secure Mode is OFF

If the secure mode is OFF and the controller 10 of the multifunction apparatus 1 receives input of the multiple jobs cancel command, the controller 10 does not analyze the analysis waiting jobs and cancels printing of the object print jobs that are to be cancelled.

Specifically, the controller 10 does not analyze the print job (A1) and delete it from the RAM 10C. The controller 10 stops analyzing the print job (A2) and deletes it from the analysis area 22.

The print job (A3) is already confirmed to be a normal print job, and therefore, the controller 10 deletes the print job (A3) from the normal job storing area 23A similar to the case in which the secure mode is ON.

The controller 10 does not store the print job (A4) in the analysis waiting job storing area 21 but reads and discards the print job (A4). The controller 10 may temporally store the print job (A4) in the analysis waiting job storing area 21 and delete it therefrom without analyzing it.

When the secure mode is OFF, the print jobs (A1), (A2) and (A4) are not analyzed and therefore, printing of the print jobs (A1), (A2) and (A4) is cancelled regardless of whether the print job is a secure print job or a normal print job.

(6) Print Cancellation Process when Receiving Multiple Jobs Cancel Command

The CPU 10A starts a print cancellation process when receiving the multiple jobs cancel command that is input by a user via the operation device 11. The transmission interface 15 receives a print job during performance of the print cancellation process. If receiving of a print job is completed during the performance of the print cancellation process, the print job is stored in the analysis waiting job storing area 21 during the performance of the print cancellation process.

Figure 4:
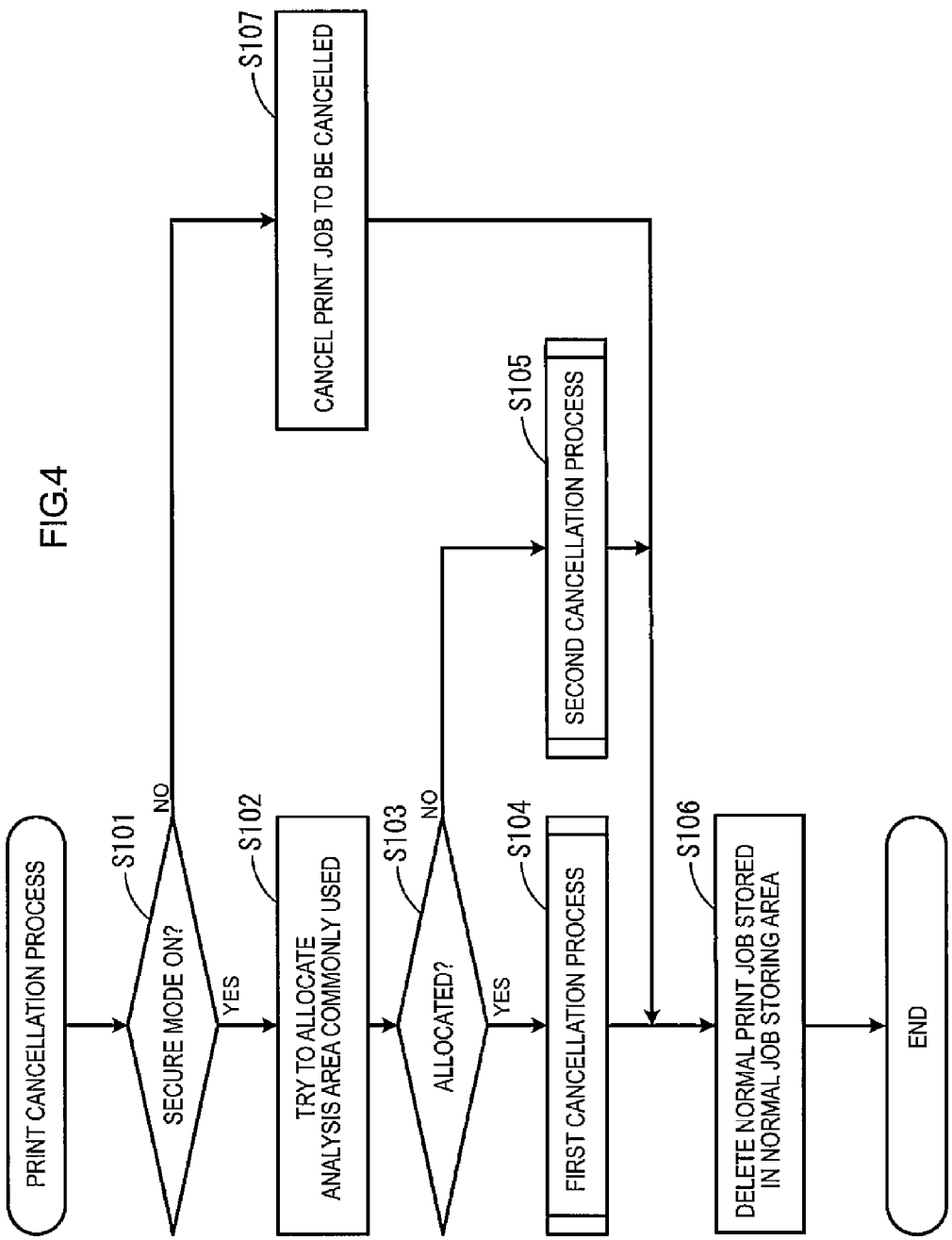
FIG. 4 is a flowchart of a print cancellation process.

As illustrated in FIG. 4, when the print cancellation process is started, the CPU 10A determines whether the secure mode of the multifunction apparatus 1 is ON of OFF in S101. If the CPU 10A determines that the secure mode is ON, the process proceeds to S103, and if the CPU 10A determines that the secure mode is OFF, the process proceeds to S107. The processing of S101 is an example of a mode determination process.

In S102, the CPU 10A tries to allocate the analysis area 22 that is commonly used for analysis of the print jobs stored in the analysis waiting job storing area 21. Specifically, the CPU 10A tries to allocate the analysis area 22 of a predetermined capacity so as to analyze the print job that requires a large capacity of the analysis area. The analysis area 22 of the predetermined capacity may be determined based on the print history or may be set by a user.

If the print job is being analyzed when receiving the multiple jobs cancel command, the analysis area 22 is temporally released to be used freely after completion of the analysis. Thereafter, the CPU 10A may try to allocate the analysis area 22 in S102. In such a case, the print job that is being analyzed is stored in the normal job storing area 23A if it is determined to be a normal print job and the print job that is being analyzed is stored in the secure job storing area 23B if it is determined to be a secure print job.

If the print job is being analyzed when receiving the multiple jobs cancel command and the capacity of the analysis area 22 that is used for the analysis is greater than the predetermined capacity, the analysis area 22 may be used for the area that will be allocated for analyzing the print jobs in the analysis waiting job storing area 21.

In S103, the CPU 10A determines whether the analysis area 22 is allocated. If determining that the analysis area 22 is allocated, the process proceeds to S104, and if determining that the analysis area 22 is not allocated, the process proceeds to S105. The processing of S102 and S103 is an example of a first allocation process. In S104, the CPU 10A performs a first cancellation process. In S105, the CPU 10A performs a second cancellation process. The processing of S102 to S105 is an example of a secure cancellation process. In S106, the CPU 10A deletes all the normal print jobs stored in the normal job storing area 23A.

In S107, among the object print jobs that are to be cancelled, the CPU 10A cancels the print jobs for which analysis is not completed without analyzing the print jobs or before finishing the analysis. The processing of S107 is an example of a non-secure cancellation process. The analysis of the print jobs whose analysis is not finished is interrupted. Canceling a print job means that the print job (A1), (A2) is deleted and the print job (A4) is read and discarded. After S107, the CPU 10A deletes all the normal print jobs stored in the normal job storing area 23A in S106.

(6-1) First Cancellation Process

Figure 5:
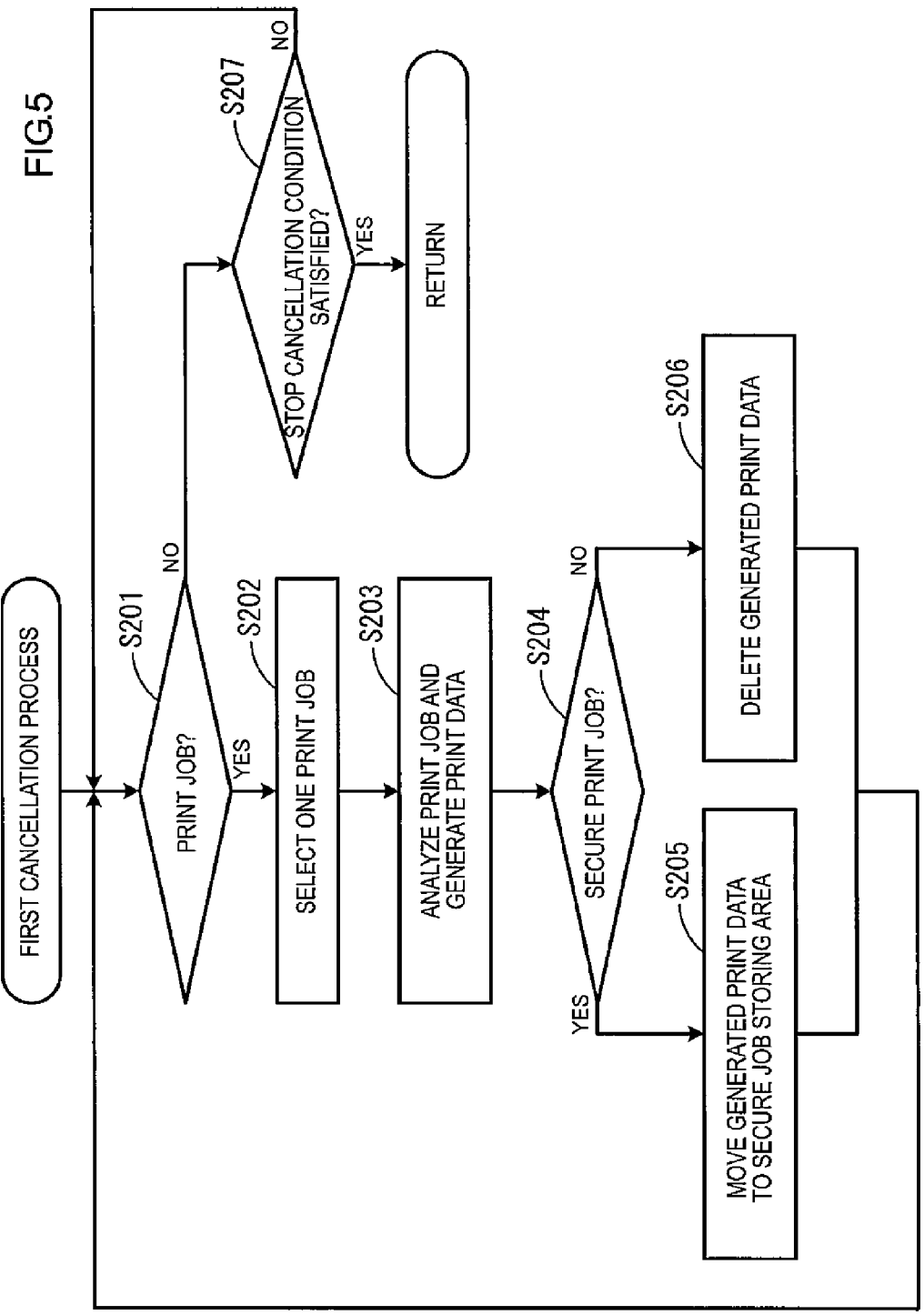
FIG. 5 is a flowchart of a first cancellation process.

As illustrated in FIG. 5, in the first cancellation process performed in S104, the CPU 10A determines in S201 whether any print job is completely received before the stopping cancellation condition is satisfied. Namely, the CPU 10A determines whether receiving a print job (A1) or a print job (A4). As described before, the controller 10 of the multifunction apparatus 1 continues receiving pint jobs from external devices until the predetermined stopping cancellation condition is satisfied. Therefore, the processing of S202 to S206 will be repeatedly performed until the processing for the received print jobs is completed and the analysis waiting job storing area 21 stores no print job. The processing of S201 will be specifically described.

As is described before, the controller 10 of the multifunction apparatus 1 continues analyzing the print job (A2) and if the print job (A2) is a normal print job, the controller 10 deletes the print job (A2), and if the print job (A2) is a secure print job, the controller 10 stores the print job (A2) in the secure job storing area 23B. Therefore, at this time, the print job is not stored in the analysis area 22.

If determining that the CPU 10A receives a print job and the received print job is already stored in the analysis waiting job storing area 21 when receiving the cancel command, or if determining that the CPU 10A receives a print job before the stopping cancellation condition is satisfied and the received print job is already stored in the analysis waiting job storing area 21, the CPU 10A determines that the print job is completely received before the stopping cancellation condition is satisfied.

On the other hand, if no print job is stored in the analysis waiting job storing area 21 and the print job is received before the stopping cancellation condition is satisfied and the received print job is not stored yet in the analysis waiting job storing area 21, the CPU 10A determines that no print job is completely received before the stopping cancellation condition is satisfied. If the analysis waiting job storing area 21 has an unoccupied area, the CPU 10A sequentially stores in the analysis waiting job storing area 21 the print jobs that are received before the stopping cancellation condition is satisfied and are not stored in the analysis waiting job storing area 21 when receiving the cancel command.

If it is determined that the CPU 10A receives a print job before the stopping cancellation condition is satisfied, the process proceeds to S202. If it is determined that the CPU 10A does not receive a print job before the stopping cancellation condition is satisfied, the process proceeds to S207.

In S202, the CPU 10A selects one of the print jobs that are received before the stopping cancellation condition is satisfied and stored in the analysis waiting job storing area 21. The print job is selected sequentially from the one that is received first. The processing of S202 is an example of a selection process.

In S203, the CPU 10A moves the print job selected in S202 to the analysis area 22 that is allocated in S102. The CPU 10A analyzes the print job using the analysis area 22 and generates print data. The processing of analyzing the print job is an example of an analysis process. The processing of S203 is an example of a first analysis process.

In S204, the CPU 10A determines whether the print job that is selected in S202 is a secure print job or a normal print job based on the analysis result obtained in S203. If determining that the print job is a secure print job, the process proceeds to S205, and if determining that the print job is a normal print job, the process proceeds to S206. In S205, the CPU 10A moves the print data generated in S203 to the secure job storing area 23B as the secure print job. The processing of S205 is an example of a first secure print job storing process.

In S206, the CPU 10A deletes the print data generated in S203 from the analysis area 22. The processing of S206 is an example of a deletion process.

In S207, the CPU 10A determines whether the stopping cancellation condition is satisfied. If the CPU 10A determines that the stopping cancellation condition is satisfied, the process returns to the print cancellation process, and if the CPU 10A determines that the stopping cancellation condition is not satisfied, the process returns to S201 and the processing is repeatedly performed.

(6-2) Second Cancellation Process

Figure 6:
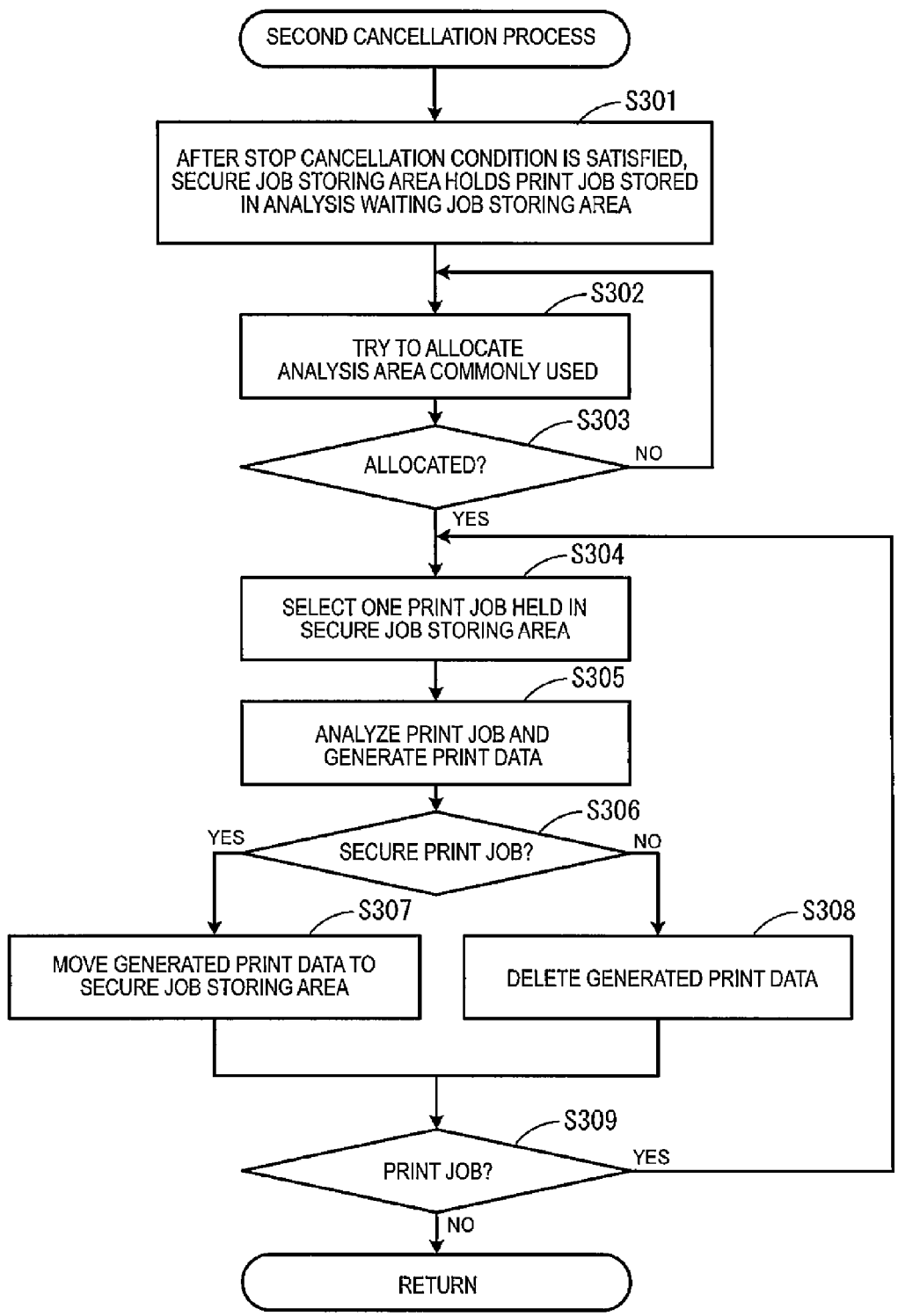
FIG. 6 is a flowchart of a second cancellation process.

In a second stopping cancellation process performed in S105, the CPU 10A waits until the stopping cancellation condition is satisfied in S301 as illustrated in FIG. 6. In S301, if determining that the stopping cancellation condition is satisfied, the CPU 10A holds in the secure job storing area 23B the print jobs that are received before the stopping cancellation condition is satisfied and stored in the analysis waiting job storing area 21. The CPU 10A holds the print jobs in the secure job storing area 23B without analyzing them. The processing of S301 is an example of a holding process.

In S302, the CPU 10A tries to allocate the analysis area 22 that is commonly used for the analysis of the unanalyzed print jobs that are stored in the secure job storing area 23B and not analyzed yet. In such a case, the CPU 10A tries to allocate the predetermined capacity of the analysis area 22 that is described before.

In S303, the CPU 10A determines whether allocation of the analysis area 22 is successful. If the CPU 10A determines that the allocation of the analysis area 22 having the predetermined capacity is successful, the process proceeds to S304, and if the CPU 10A determines that the allocation of the analysis area 22 having the predetermined capacity is failed, the process returns to S302 and the processing is repeatedly performed until the allocation of the analysis area 22 is successful. The processing of S302 and S303 is an example of a second allocation process.

In S304, the CPU 10A selects one of the unanalyzed print jobs that are held in the secure job storing area 23B and are not analyzed yet. The print job is selected sequentially from the one that is received first. The processing of S304 is an example of a second selection process.

In S305, the CPU 10A moves the print job that is selected in S304 to the analysis area 22 that is allocated in S302. The CPU 10A analyzes the analysis data corresponding to the selected print job with using the analysis area 22 and generates print data. The processing of S305 is an example of a second analysis process.

In S306, the CPU 10A determines whether the print job selected in S304 is a secure print job or a normal print job based on the analysis result obtained in S305. If the CPU 10A determines that the selected print job is a secure print job, the process proceeds to S307, and if the CPU 10A determines that the selected print job is a normal print job, the process proceeds to S308.

In S307, the CPU 10A moves the print data that is generated in S305 to the secure print job storing area 23B as the secure print job. The processing of S307 is an example of a second secure print job storing process.

In S308, the CPU 10A deletes the print data generated in S305 from the analysis area 22. The processing of S308 is an example of a second deletion process.

In S309, the CPU 10A determines whether an unanalyzed print job that is not analyzed yet is stored in the secure job storing area 23B. If the CPU 10A determines that an unanalyzed print job is not stored in the secure job storing area 23B, the process returns to the print cancellation process. If the CPU 10A determines that an unanalyzed print job is stored in the secure job storing area 23B, the process returns to S304, and the processing is repeatedly performed.

(7) Advantageous Effects

In the multifunction apparatus 1, if the secure mode is ON, the print job for which analysis is not completed is analyzed and it is determined whether the analyzed print job is a secure print job or a normal print job based on the analysis result. Therefore, the printing of the normal print job is cancelled without canceling the printing of the secure print job.

If the secure mode is not ON, the printing of the print job for which analysis is not completed is cancelled without waiting for the completion of the analysis or before completion of the analysis. Therefore, a user who inputs a cancel command is less likely to wait for a long time until the cancellation is completed.

Therefore, the controller 10 of the multifunction apparatus 1 performs operations according to both of a user's request that the secure print job is not canceled even with inputting of a cancel command and another user's request to cancel the print job as soon as possible.

Further, if determining that the object print job is a normal print job, the controller 10 of the multifunction apparatus 1 deletes the normal print job from the RAM 10C and the printing of the normal print job is cancelled. On the other hand, if determining that the object print job is a secure print job, the controller 10 controls the RAM 10C to hold the secure print job therein and the printing of the secure print job is not cancelled.

When canceling the printing of a plurality of print jobs collectively, the printing of the print job for which receiving is not completed at the time of receiving the cancel command is also cancelled.

Compared to a case in which the print job that is received during a period from the receiving of the cancel command to a time when the predetermined stopping cancellation condition is satisfied is deleted after being stored in the RAM 10C, the processing efficiency is enhanced in the multifunction apparatus 1.

If the analysis area 22 is not successfully allocated, the print job for which the analysis is not completely finished is held in the RAM 10C in a state that the printing is unable to be performed. A secure print job may be included among the print jobs for which the analysis is not completed. Therefore, if the controller 10 of the multifunction apparatus 1 fails to allocate the analysis area 22 and the printing of the print jobs is canceled without performing analysis, it may be a troublesome for a user who does not want to cancel the secure print job.

If the controller 10 fails to allocate the analysis area 22, the print job for which the analysis is not completed is stored in the RAM 10C in a state that the printing is unable to be performed. Therefore, the secure print job may not be cancelled. Also, the printing of the print job for which the analysis is not completed is not performed.

The allocated analysis area 22 is commonly used for the analysis of a plurality of print jobs. Therefore, in response to the one cancel command, the process of allocating the analysis area 22 is performed once. This enhances the processing efficiency.

The controller 10 of the multifunction apparatus 1 analyzes the pint job for which the analysis is not completed due to the failure of the previous allocation of the analysis area 22 when the controller 10 successfully allocates the analysis area 22. Accordingly, the secure print job may not be cancelled. In such a case, the analysis area 22 that is commonly used for the analysis of the print jobs stored in the secure job storing area 23B is allocated. Therefore, the process of allocating the analysis area 22 is performed once. This enhances the processing efficiency.

When the cancel command receiver receives the cancel command, the processor may delete the normal print jobs that are already stored in the memory therefrom and hold the secure print jobs that are already stored in the memory thereto.

Since the normal print jobs that are already stored in the memory are deleted therefrom, printing of the normal print jobs that are already stored in the memory is canceled. Since the secure print jobs that are already stored in the memory are held therein, printing of the secure print jobs that are already stored in the memory is not cancelled.

<Another Illustrative Aspect>

In the above aspect, the analysis area 22 that is commonly used for the analysis of a plurality of print jobs is allocated. However, a capacity of the analysis area 22 required for the analysis changes according to the print job or a kind of the print job. The controller 10 of the multifunction apparatus 1 may allocate the analysis area 22 for every print job and release the analysis area 22 every time the analysis of one print job is finished.

(1) Print Cancellation Process when Receiving Multiple Jobs Cancel Command

Figure 7:
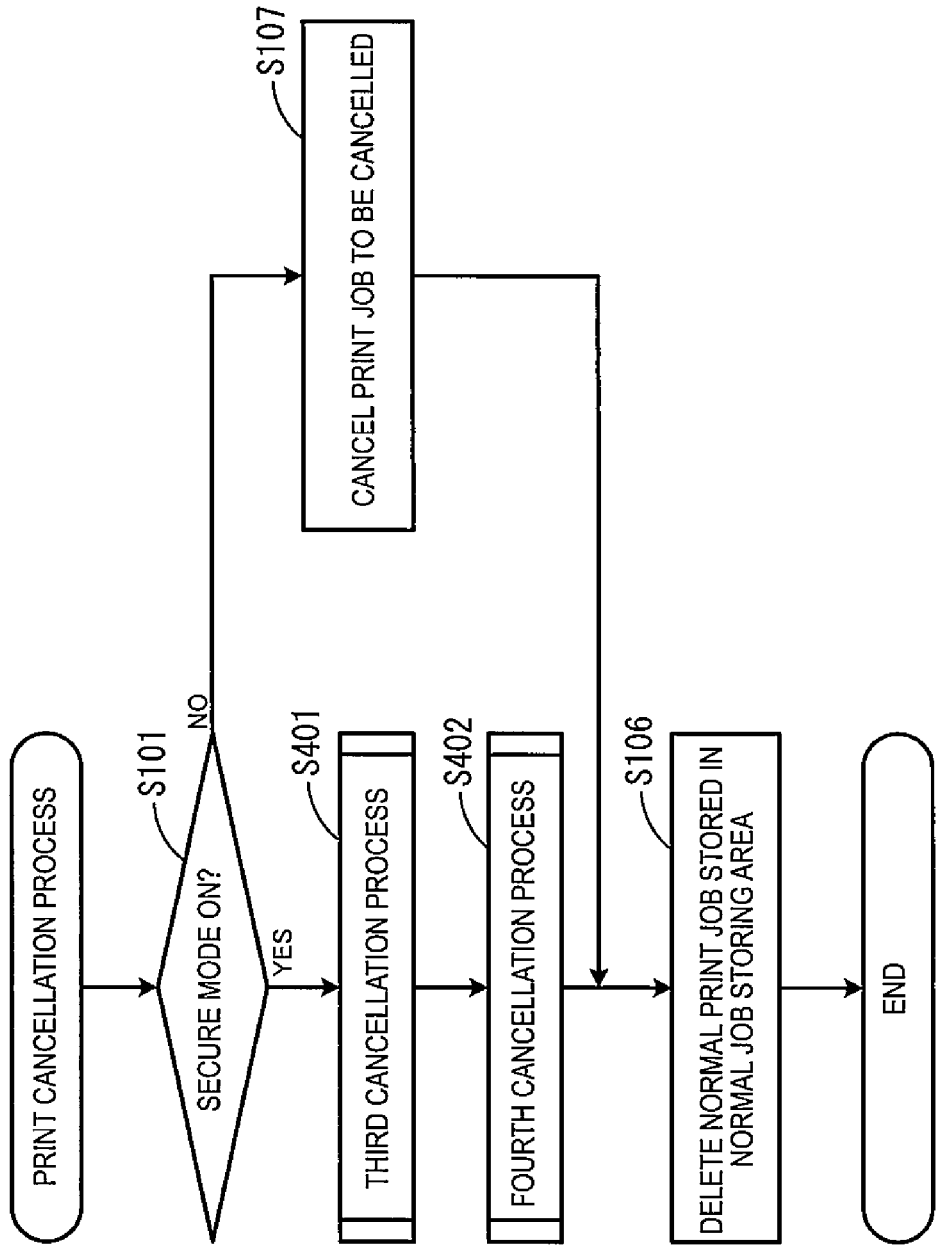
FIG. 7 is a flowchart of a print cancellation process according to another illustrative aspect.

Another print cancellation process will be described with reference to FIG. 7. The same symbols or numbers are applied to the substantially same process as described above and the substantially same processes will not be explained. In the following print cancellation process, steps S401 and S402 are performed instead of the steps S102 to S105 in the above print cancellation process.

In S401, the CPU 10A executes a third cancellation process. In S402, the CPU 10A executes a fourth cancellation process. The processing of S401 and S302 is an example of the secure cancellation process.

(2) Third Cancellation Process

The third cancellation process performed in S401 will be described with reference to FIG. 8. The same numerals are applied to the substantially same processes as the above first cancellation process and the same processes will not be explained.

In S501, the CPU 10A selects one of the print jobs for which the receiving is completed before the stopping cancellation condition is satisfied and that are stored in the analysis waiting job storing area 21. The processing of S501 is an example of a third selection process.

In S502, the CPU 10A determines a capacity of the analysis area 22 that is required for the analysis based on the kind of the print job that is selected in S501. The processing of S502 is an example of a capacity determination process.

In S503, the CPU 10A tries to allocate the analysis area 22 having the capacity that is determined in S502.

In S504, the CPU 10A determines whether the allocation of the analysis area 22 is successful in S503. If the CPU 10A determines that the allocation of the analysis area 22 is failed, the process proceeds to S505. If the CPU 10A determines the allocation of the analysis area 22 is successful, the process proceeds to S506. The processing of S503 and S504 is an example of a third allocation process.

In S505, the CPU 10A controls the secure job storing area 23B to hold the print job that is selected in S501. After the secure job storing area 23B holds the print job, the process returns to S201 and the processing is repeatedly performed. The processing of S505 is an example of a holding process.

In S506, the CPU 10A moves the print job selected in S501 to the analysis area 22 that is allocated in S503. The CPU 10A analyzes the print job with using the analysis area 22 and generates print data. The processing of S506 is an example of a third analysis process.

In S507, the CPU 10A determines whether the print job selected in S501 is a secure print job or a normal print job based on the analysis result obtained in S506. If the CPU 10A determines that the selected print job is a secure print job, the process proceeds to S508, and if the CPU 10A determines that the selected print job is a normal print job, the process proceeds to S509.

In S508, the CPU 10A moves the print data that is generated in S506 to the secure job storing area 23B as a secure print job. The processing of S508 is an example of a third secure print job storing process.

In S509, the CPU 10A deletes the print data generated in S506 from the analysis area 22. The processing of S509 is an example of a third deletion process.

In S510, the CPU 10A releases the analysis area 22 that is allocated in S503 to be freely used. The processing of S510 is an example of a first releasing process.

(3) Fourth Cancellation Process

A fourth cancellation process performed in S402 will be described with reference to FIG. 9. In S601, the CPU 10A selects one of the unanalyzed print jobs that are held in the secure job storing area 23B and not analyzed yet. The processing of S601 is an example of a fourth selection process.

In S602, the CPU 10A determines a capacity of the analysis area that is required for the analysis based on a kind of the print job that is selected in S601. The processing of S602 is an example of a second capacity determination process.

In S603, the CPU 10A tries to allocate the analysis area 22 of the capacity determined at S602.

In S604, the CPU 10A determines whether the allocation of the analysis area 22 in S603 is successful. If the CPU 10A determines the allocation of the analysis area 22 is successful, the process proceeds to S605, and if the CPU 10A determines that the allocation of the analysis area 22 is failed, the process returns to S603 and performs the processes repeatedly until the allocation of the analysis area 22 is successful. The processing of the S603 and S604 is an example of a fourth allocation process.

In S605, the CPU 10A moves the print job that is selected in S601 to the analysis area 22 that is allocated in S603. The CPU 10A analyzes the print job with using the analysis area 22 and generate print data. The processing of S605 is an example of a fourth analysis process.

In S606, the CPU 10A determines whether the print job selected in S601 is a secure print job or a normal print job based on the analysis result obtained in S605. If the CPU 10A determines that the selected print job is a secure print job, the process proceeds to S607, and if the CPU 10A determines that the selected print job is a normal print job, the process proceeds to S608.

In S607, the CPU 10A moves the print data generated in S605 to the secure job storing area 23B as the secure print job. The processing of S607 is an example of a fourth secure print job storing process.

In S608, the CPU 10A deletes the print data generated in S605 from the analysis area 22. The processing of S608 is an example of a fourth deletion process.

In S609, the CPU 10A releases the analysis area 22 that is allocated in S603. The processing of S609 is an example of a second releasing process.

In S610, the CPU 10A determines whether the secure job storing area 23B stores any unanalyzed print job. If the CPU 10A determines that the secure job storing area 23B stores an unanalyzed print job, the process proceeds to S601, and if the CPU 10A determines that the secure job storing area 23B stores no unanalyzed print job, the process returns to the print cancellation process.

(4) Advantageous Effects

The capacity of the analysis area 22 that is required for the analysis is determined for every print job and the analysis area 22 is allocated. The analysis area 22 for analyzing the print job that requires a large capacity of the analysis area may not be able to be allocated. Even in such a case, if the analysis area 22 for analyzing the print job that does not require a large capacity is successfully allocated, the analyzing of the print job that does not require such a large capacity of analysis area 22 is preformed first.

The capacity of the analysis area 22 that is required for the analysis is determined for every print job and the analysis area 22 is allocated. Therefore, if the capacity of the analysis area 22 required for the analysis is small, the area occupied by the analysis area 22 in the RAM is small and this enables the operations to be performed efficiently. One of the print jobs stored in the analysis waiting job storing area 21 for which a capacity of the analysis area required for analyzing the one of the print jobs is successfully allocated at this time is analyzed first. This improves operation efficiency.

The controller 10 of the multifunction apparatus 1 analyzes the print job that is held in the secure job storing area 23B and for which analysis is not finished yet. Accordingly, the secure print job is not canceled.

<Other Illustrative Aspects>

The technology disclosed in the above description is not limited to the illustrative aspects described above with reference to the drawings. The following illustrative aspects may be included in the technical scope of the disclosed technology.

(1) In the above description, the cancel command includes the single job cancel command and the multiple jobs cancel command. The cancel command may include only one of the single job cancel command and the multiple jobs cancel command.

(2) In the above description, the print cancellation process when receiving the multiple jobs cancel command is described. The print cancellation process when receiving the single job cancellation process may be similar to the process in the above description. The secure mode of the multifunction apparatus 1 is turned ON, and if the active print job is not analyzed yet, that is, the active print job is a print job that is in a state of analyzing (State 3), waiting for analysis (State 4) or receiving (State 5), the print job is analyzed. If the active print job is a secure job, the print job is moved to the secure job storing area. If the active print job is a normal job, the print job is deleted. On the other hand, the secure mode is turned OFF, and if the active print job is not analyzed yet, the print job is deleted or read and discarded without being analyzed.

(3) In the above description, if the cancel command is input, the print job stored in the analysis waiting job storing area 21 is analyzed and print data is generated, and it is determined whether the print job is a secure print job or a normal print job based on the analysis result. However, the print data may not be generated and only the analysis is performed to determine whether the print job is a secure print job or a normal print job.

For example, for a print job in which a print condition and image data represented by a bit map are separately described or a print job in which a print condition and image data represented by a page description language are separately described, the analysis and the generation of print data may be performed independently. Such a print job may be only analyzed to determine whether the print job is a secure print job or a normal print job.

(4) In the above description, the predetermined stopping cancellation condition includes the conditions (B1) and (B2). However, the stopping cancellation condition is not necessarily limited thereto but may include any other conditions if necessary.

(5) In the above description, if the allocation of the analysis area 22 is failed, the controller 10 of the multifunction apparatus 1 controls the secure job storing area 23B to hold the print jobs stored in the analysis waiting job storing area 21. However, the secure job storing area 23B may not hold the print jobs but the print jobs may be kept to be stored in the analysis waiting job storing area 21. In such a case, the print job stored in the analysis waiting job storing area 21 may not be deleted.

However, if the print job stored in the analysis waiting job storing area 21 is maintained to be stored therein without being deleted, the printing of a normal print job may not be cancelled. Therefore, if the print job is maintained to be stored in the analysis waiting job storing area 21, the printing may be suspended until the analysis area 22 is successfully allocated and the analysis is performed.

(6) In the above description, after the allocation of the analysis area 22 is failed and the secure print job storing area holds the print job, the print job held by the secure print job storing area is analyzed. In such analyzing, the analysis area 22 is allocated for each print job. However, in analyzing the print job held by the secure print job storing area, the analysis area 22 that is commonly used for analysis of a plurality of print jobs may be allocated and the analysis area 22 may be commonly used to analyze the print jobs.

(7) In the above description, a multifunction apparatus is used as the printing apparatus. However, the printing apparatus may be a printer having a single function or may be a facsimile device.

(8) In the above description, the CPU 10A is used as the processor. However, the processor unit may be configured with a plurality of CPUs or may be configured with an ASIC or may be configured with a CPU and an ASIC.

The invention claimed is:

1. A printing apparatus comprising:
a job receiver;
a printing unit;
a command receiver;
a processor; and
a memory storing instructions that, when executed by the processor, cause the printing apparatus to:
analyze a print job received by the job receiver;
cause the printing unit to print an image based on an analyzed print job that is received by the job receiver and whose analysis is finished;
determine whether the printing apparatus is in a secure mode in which the printing unit prints the image after successful user certification when the command receiver receives a cancel command for cancelling printing of the print job; and
perform a secure cancellation process when the command receiver receives the cancel command and the printing apparatus is in the secure mode, the secure cancellation process including:
analyzing a print job that is received by the job receiver and whose analysis is not finished;
determining whether an analyzed print job is a secure print job that is associated with a password or a normal print job that is not associated with a password in accordance with an analysis result;
maintaining printing of the analyzed print job when the analyzed print job is the secure print job; and
cancelling the printing of the analyzed print job when the analyzed print job is the normal print job, and
perform a non-secure cancellation process when the command receiver receives the cancel command and the printing apparatus is not in the secure mode, the non-secure cancellation process including cancelling the printing of the print job that is received by the job receiver.

2. The printing apparatus according to claim 1,
wherein the memory is further configured to store the print job received by the job receiver; and
wherein the secure cancellation process further includes:
deleting the analyzed print job that is determined to be the normal print job from the memory; and
holding the analyzed print job that is determined to be the secure print job.

3. The printing apparatus according to claim 1,
wherein the memory is further configured to store the print job received by the job receiver; and
wherein the print job whose analysis is not finished includes a print job that is stored in the memory and whose analysis is not finished when the command receiver receives the cancel command and a print job that is received during a period from receiving the cancel command to a time when a stopping cancellation condition is satisfied.

4. The printing apparatus according to claim 1,
wherein the memory is further configured to store the print job received by the job receiver; and
wherein the non-secure cancellation process further includes:
discarding the print job that is received before a stopping cancellation condition is satisfied without storing the print job in the memory.

5. The printing apparatus according to claim 1,
wherein the memory is further configured to store the print job received by the job receiver; and
wherein the secure cancellation process further includes:
trying to allocate an analysis area having a predetermined capacity in the memory, the analysis area being used for analyzing the print job that is received by the job receiver and whose analysis is not finished;
determining whether allocation of the analysis area is successful; and
holding the print job that is received by the job receiver and whose analysis is not finished when the allocation of the analysis area is not successful.

6. The printing apparatus according to claim 5, wherein the secure cancellation process further includes holding the print job that is received by the job receiver and whose analysis is not finished in a state such that printing is not performed for the print job when the allocation of the analysis area is not successful.

7. The printing apparatus according to claim 5, wherein the analysis area is used for analyzing a plurality of the print jobs that are received by the job receiver and whose analysis is not finished.

8. The printing apparatus according to claim 5, wherein the secure cancellation process further includes:
analyzing the print job that is received by the job receiver and whose analysis is not finished and stored in the memory, by using the analysis area which is allocated in the memory when the allocation of the analysis area is successful;
holding the secure print job in the memory when the analyzed print job is the secure print job in accordance with an analysis result; and
deleting the normal print job from the memory when the analyzed print job is the normal print job in accordance with the analysis result.

9. The printing apparatus according to claim 5, wherein the secure cancellation process further includes:
trying to allocate the analysis area repeatedly before the allocation of the analysis area is successful, when the plurality of the print jobs that is received by the job receiver and whose analysis is not finished is held in the memory;
analyzing the print job that is received by the job receiver and whose analysis is not finished and that is held in the memory, by using the analysis area which is allocated in the memory when the allocation of the analysis area is successful;

holding the secure print job in the memory when the analyzed print job is the secure print job in accordance with the analysis result; and deleting the normal print job from the memory when the analyzed print job is the normal print job in accordance with the analysis result.

10. The printing apparatus according to claim 9, wherein the analysis area is used for analyzing print jobs that are received by the job receiver and whose analysis is not finished.

11. The printing apparatus according to claim 5, wherein the secure cancellation process further includes:

determining a capacity of an analysis area required for analyzing the print job that is received by the job receiver and whose analysis is not finished; and trying to allocate an analysis area having a determined capacity in the memory.

12. The printing apparatus according to claim 5, wherein the analysis area is used for analyzing one of a plurality of the print jobs that are received by the job receiver and whose analysis is not finished, and wherein the secure cancellation process further includes:

analyzing the one of the plurality of the print jobs by using the analysis area which is allocated in the memory when the allocation of the analysis area is successful;

moving the secure print job from the analysis area to a secure job storing area included in the memory when the analyzed print job is the secure print job in accordance with an analysis result;

deleting the normal print job from the analysis area when the analyzed print job is the normal print job in accordance with the analysis result; and releasing the analysis area after the analysis of the one of the plurality of the print jobs is completed.

13. The printing apparatus according to claim 12, wherein the secure cancellation process further includes:

trying to allocate the analysis area repeatedly before the allocation of the analysis area is successful, when the plurality of the print jobs that is received by the job receiver and whose analysis is not finished is held in the memory;

analyzing the one of the plurality of the print jobs by using the analysis area which is allocated in the memory when the allocation of the analysis area is successful;

moving the secure print job to the secure job storing area included in the memory when the analyzed print job is the secure print job in accordance with an analysis result;

deleting the normal print job from the memory when the analyzed print job is the normal print job in accordance with the analysis result; and releasing the analysis area after the analysis of the one of the plurality of the print jobs is completed.

14. The printing apparatus according to claim 1, wherein the instructions further cause the printing apparatus to:

delete the normal print job that has been stored in the memory therefrom and hold the secure print job that has been stored in the memory therein, when the command receiver receives the cancel command.

15. The printing apparatus according to claim 1, wherein the non-secure cancellation process includes interrupting analysis of the print job whose analysis is not finished and cancelling the printing of the print job whose analysis is interrupted.

16. A non-transitory computer readable medium storing computer executable instructions that, when executed, cause a printing apparatus to:

receive a print job;

analyze the print job;

print an image based on an analyzed print job whose analysis is finished;

determine whether the printing apparatus is in a secure mode in which the printing apparatus performs an image forming operation after successful user certification when receiving a cancel command for cancelling printing of the print job; and perform a secure cancellation process when receiving the cancel command and the printing apparatus is in the secure mode, the secure cancellation process including:

analyzing the print job whose analysis is not finished;

determining whether an analyzed print job is a secure print job that is associated with a password or a normal print job that is not associated with a password in accordance with an analysis result;

maintaining printing of the analyzed print job when determining that the analyzed print job is the secure print job; and cancelling the printing of the analyzed print job when determining that the analyzed print job is the normal print job, and perform a non-secure cancellation process when receiving the cancel command and the printing apparatus is not in the secure mode, the non-secure cancellation process including cancelling the printing of the print job.

17. A method comprising:

receiving a print job by a printing apparatus;

analyzing the print job;

printing an image based on an analyzed print job whose analysis is finished;

determining whether the printing apparatus is in a secure mode in which the printing apparatus performs an image forming operation after successful user certification when receiving a cancel command for cancelling printing of the print job;

performing a secure cancellation process when receiving the cancel command and the printing apparatus is in the secure mode, the secure cancellation process including:

analyzing the print job whose analysis is not finished;

determining whether an analyzed print job is a secure print job that is associated with a password or a normal print job that is not associated with a password in accordance with an analysis result;

maintaining printing of the analyzed print job when determining that the analyzed print job is the secure print job; and cancelling the printing of the analyzed print job when determining that the analyzed print job is the normal print job, and performing a non-secure cancellation process when receiving the cancel command and the printing apparatus is not in the secure mode, the non-secure cancellation process including cancelling the printing of the print job.

* * * * *